(12) United States Patent
Katsuhiro

(10) Patent No.: US 6,675,099 B2
(45) Date of Patent: Jan. 6, 2004

(54) METHOD AND SYSTEM FOR ESTIMATION OF RAINFALL INTENSITY IN MOUNTAINOUS AREA

(75) Inventor: Nakagawa Katsuhiro, Tokyo (JP)

(73) Assignee: Communication Research Laboratory, Independent Administrative Institution, Koganei (JP)

(*) Notice: Subject to any disclaimer, the term of this patent is extended or adjusted under 35 U.S.C. 154(b) by 0 days.

(21) Appl. No.: 10/185,013

(22) Filed: Jul. 1, 2002

(65) Prior Publication Data
US 2003/0025628 A1 Feb. 6, 2003

(30) Foreign Application Priority Data
Aug. 6, 2001 (JP) .......... 2001-238217

(51) Int. Cl.⁷ .......... G01S 13/00; G06F 19/00
(52) U.S. Cl. .......... 702/3; 342/26
(58) Field of Search .......... 342/26; 702/17, 702/5

(56) References Cited

U.S. PATENT DOCUMENTS

| | | | | |
|---|---|---|---|---|
| 4,893,506 A | * | 1/1990 | Shyu et al. | 73/170.19 |
| 5,406,481 A | * | 4/1995 | Shinozawa et al. | 702/3 |
| 6,018,307 A | * | 1/2000 | Wakayama et al. | 342/26 |
| 6,477,468 B1 | * | 11/2002 | Dahlke | 702/3 |
| 6,581,009 B1 | * | 6/2003 | Smith | 702/3 |

OTHER PUBLICATIONS

"GMS-5 Infrared Rainfall Estimation Using TRMM-PR Data," taken from the world wide web at http://www.eumetsat.de/en/area2/proceedings/eump33/pdf/session_4/poster/sato/pdf.*

"Earth Observation Satellite," taken from the world wide web at http://www.eoc.nasda.go.jp/guide/satellite/satdata/trmm_e.html.*

* cited by examiner

Primary Examiner—Thomas H. Tarcza
Assistant Examiner—Brian Andrea
(74) Attorney, Agent, or Firm—Birch, Stewart, Kolasch & Birch, LLP

(57) ABSTRACT

Here are provided rainfall intensity output means adapted to output rainfall intensity R as a value equivalent to a linear function of altitude H: $R(H)=aH+b$, and processing means adapted to identify parameters a and b in the above estimate equation by regression analysis using a measurement value obtained by rainfall vertical distribution. This invention provides thereby method and system for estimation of rainfall distribution based on rainfall spatial distribution in mountainous area.

8 Claims, 1 Drawing Sheet

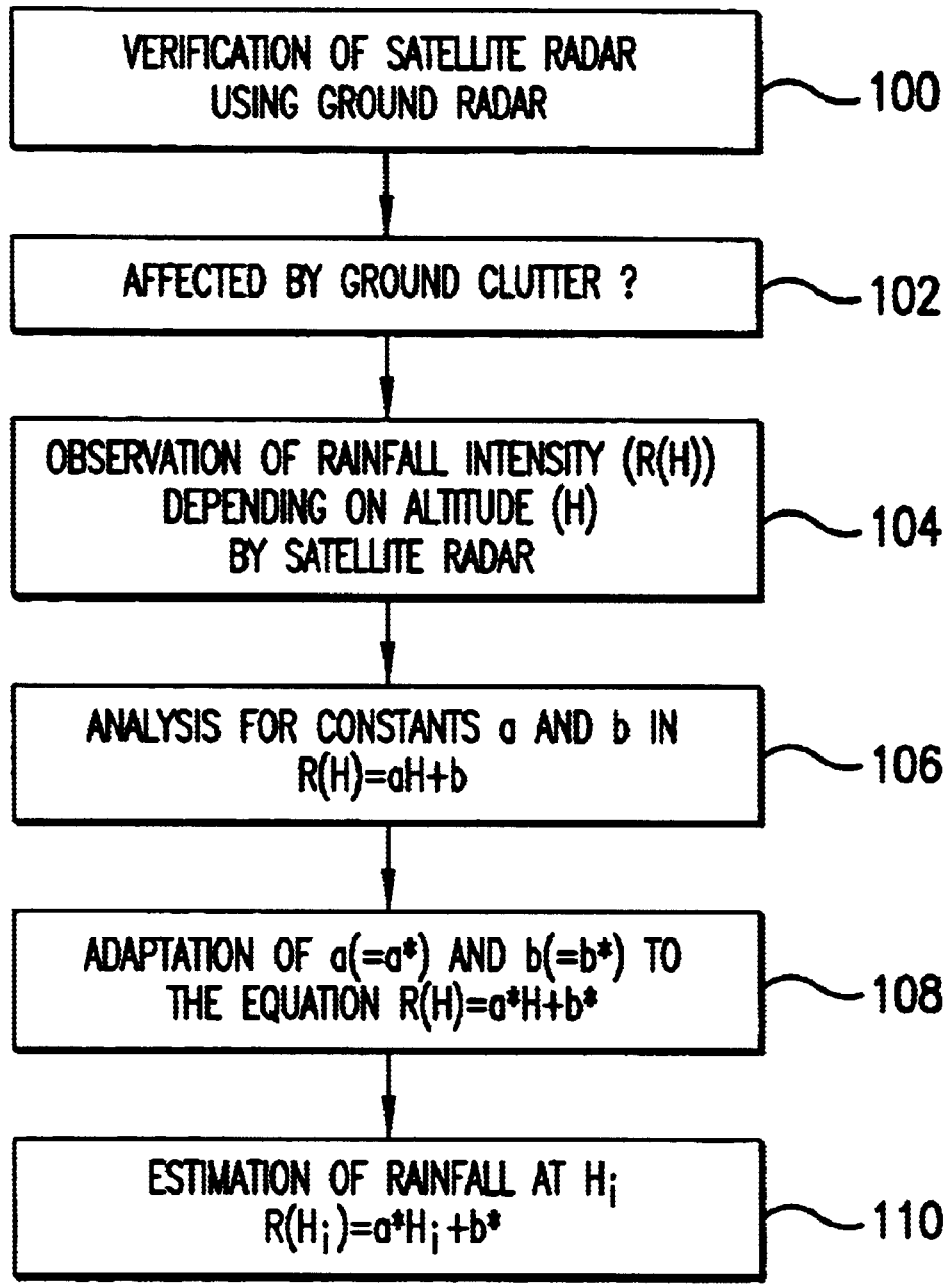
THE FIG.

METHOD AND SYSTEM FOR ESTIMATION OF RAINFALL INTENSITY IN MOUNTAINOUS AREA

BACKGROUND OF THE INVENTION

Field of the Invention

This invention relates to method a and system for estimation of rainfall intensity in mountainous area using satellite radar.

DISCUSSION OF THE BACKGROUND

The determination of rainfall distribution in a land area, particularly, in a mountainous area is essential for flood analysis and to estimate potential water resources.

Currently, however, rainfall observation in mountainous areas can best be carried out by relying upon point-observation using ground rain gauges installed at a limited number of points along valleys or plane-observation using ground rainfall radar, where the radar beam propagates at a level as high as several kilometers above the mountain peak. This is true even in an area provided with a highly efficient ground rainfall observation network.

Under these circumstances, it is extremely difficult to determine the spatial distribution of rainfall in a mountainous area.

SUMMARY OF THE INVENTION

In view of the problem as has been described above, it is a principal object of this invention to provide a method for estimation of rainfall distribution based on spatial distribution of rainfall in mountainous area and a system used to carry out this method.

The object set forth above is achieved by the method and the system for estimation of rainfall distribution in mountainous area comprising means as will be described below.

Specifically, the system according to this invention comprises a rainfall intensity output means adapted to output a rainfall intensity R as a linear function of altitude H: $R(H)=aH+b$, and a processing means adapted to identify parameters a and b in the above estimate equation by regression analysis using a measurement value obtained by rainfall vertical distribution.

With this system, the rainfall intensity R is estimated as a linear function of altitude H: $R(H)=aH+b$ where the constants a and b are identified by regression analysis using a vertical distribution of rainfall obtained by satellite radar.

The regression analysis may be carried out using the vertical distribution of rainfall obtained at a level lower than the bright band altitude in order to improve the accuracy of the estimate equation.

Rainfall radar launched on a TRMM/PR satellite is useful for this purpose.

BRIEF DESCRIPTION OF THE DRAWINGS

A more complete appreciation of the invention and many of the attendant advantages thereof will be readily obtained as the same becomes better understood by reference to the following detailed description considered in connection with the accompanying drawings, wherein the FIGURE shows a flow chart of the process of the present invention.

DETAILED DESCRIPTION OF THE INVENTION

Details of this invention will be more fully understood from the description of the preferred embodiments given hereunder.

The inventors have developed the present method for estimation of ground rainfall in a mountainous area using ground-based radar, comprising the steps of verifying TRMM/PR data from TRMM/PR satellite having rainfall radar on board and determining the rainfall structure in a mountainous area in which it had been extremely difficult to determine spatial distribution of rainfall.

A continuous observation was carried out by optical rain gauges installed on two points on OHDAIGAHARA of KII Peninsula which is well known as a mountainous heavy rain area to compensate for intermittent observation by the TRMM/PR. In addition, a cross verification was carried out by analyzing the observation data of the ground-based rainfall radar and the TRMM/PR. As the ground rainfall radar, a deep mountain radar rain gauge was used, which was installed by Ministry of Land, Infrastructure and Transport to carry out a three-dimensional observation of rainfall on the periphery of OHDAIGAHARA, the area for ground observation.

Optical rain gauges (one minute intensity meter) were installed at two points, point C-close by OHDAIGAHARA Church in the vicinity of OHDAIGAHARA peak: N 34° 10' 46.5", E 136° 05' 55.5", altitude of 1639 m and point D-close by a drive-in location, on the breast of OHDAIGAHARA: N 34° 0.5' 13' 43.9", E 136° 01' 00.3", altitude of 1080 m and ground rainfall observation was continuously carried out using these optical rain gauges.

It should be understood that the point C near the mountain peak is above the cloud base and the point D on the breast is often lower than the cloud base. At these points of observation, concurrent observation is carried out using a tipping bucket rain gauge, fog monitor, thermometer and hygrometer. Such concurrent observation allows for not only various calibrations, but also the determination whether the observation point lies above or below the cloud base.

OHDAIGAHARA is often in the path of typhoons. In view of the fact that the optical rain gauge is a system adapted to collect data by PC and the failure of a power supply may result in missing data, the inventors developed a data collecting system using a logger device using no power source in order to avoid missing data due to the failure of PC power source.

Prior to verification of the TRMM/PR data, the accuracy of the optical rain gauge was evaluated using the tipping bucket rain gauge (based on rainfall for 10 minutes). Taking account of the fact that the optical rain gauge is per se based on a one-minute rainfall intensity, the inventors have converted the value indicated by the optical rain gauge into a 10-minute rainfall to be compareable with the indication by the tipping bucket rain gauge. It was found from this comparison that a difference is 1.0 mm or less and the optical rain gauge adapted to indicate one minute rainfall intensity is adequately useful for ground verification of instantaneously observed rainfall data from the TRMM/PR.

The differential rainfall observed at two points lying at different altitudes indicated that the rainfall value observed by the tipping bucket rain gauges installed at the point C in the vicinity of the mountaintop is higher than the rainfall value observed by the tipping bucket rain gauges installed at the point D on the mountain breast. Such a differential rainfall suggests that the mountaintop is systematically exposed to rainfall heavier than the rainfall to which the mountain breast is exposed, when several rainfall systems of the scale covering the observation points pass the observation area.

Then, the TRMM/PR data was verified using the ground rainfall radar.

The horizontal distribution of the radar reflectivity factor after rainfall decay compensation at an altitude of 2 km observed by TRMM/PR was compared to the horizontal distribution of the radar reflectivity factor observed by the deep mountain radar rain gauge in a fixed elevation angle mode for a period of TRMM satellite's passage.

A comparison of these two distributions suggested that the rainfall pattern in the vicinity of OHDAIGAHARA is of a convective type on account of an extremely high radar reflectivity factor value in a limited area.

Based on the fact that the radar reflectivity factor is remarkably increased due to typhoon or the like, particularly in mountainous area, such remarkably high radar reflectivity factor had conventionally been considered to be an effect by ground clutter.

However, the horizontal distribution of the radar reflectivity factor observed by the TRMM/PR also indicated a remarkably high value in the vicinity of OHDAIGAHARA and proved that such a high radar reflectivity factor is independent from the effect of the ground clutter. In this way, both the efficacy of rainfall observation using the TRMM/PR data from air space above and the efficacy of the rainfall radar installed on ground were demonstrated.

On another date and hour, the horizontal distribution of the radar reflectivity factor after rainfall decay compensation at an altitude of 2 km observed by the TRMM/PR was compared to the horizontal distribution of the radar reflectivity factor observed by the deep mountain radar rain gauge in fixed elevation angle mode for a period of TRMM satellite's passage, in the same manner as in the previous case.

The comparison indicated that the radar reflectivity factor is relatively low in a wide range with respect to rainfall in the vicinity of OHDAIGAHARA according to ground observation. Such an observation result suggested that this rainfall is stratiform rainfall.

From a comparison of the horizontal distribution of the radar reflectivity factor observed by the TRMM/PR to the horizontal distribution of the radar reflectivity factor observed by the deep mountain radar rain gauge in fixed elevation angle mode in this manner, it was found that both horizontal distributions are substantially in qualitative coincidence with each other throughout the entire period and that TRMM/PR is effective in determining the horizontal rainfall distribution so far as a limited period of observation is concerned.

Thus, the three-dimensional data of the TRMM/PR were verified using the deep mountain radar rain gauge adapted for three-dimensional observation of rainfall.

The vertical distributions of radar reflectivity factors respectively obtained by the TRMM/PR in air space just above two points C and D and by the deep mountain radar rain gauge were compared to each other. The TRMM/PR had a spatial resolution of 250 m in the vertical direction. The deep mountain radar rain gauge used a value of radar reflectivity factor at the radar beam center altitude.

Vertical distributions of radar reflectivity factors respectively obtained by the TRMM/PR in air space just above ground observation points and by the deep mountain radar rain gauge were compared to each other.

The comparison indicated that the radar reflectivity factor obtained by the deep mountain radar rain gauge is higher than that obtained by the TRMM/PR by approximately 5 dBZ but the variation patterns of these two vertical distributions well coincide with each other so far as the point D is concerned. At the point C, on the other hand, the factor obtained by the deep mountain radar rain gauge was higher than that obtained by TRMM/PR by approximately 10 dBZ but the variation patterns of these two vertical distributions well coincide with each other.

The vertical distribution of the factor obtained by the TRMM/PR presented a continuous variation and it is speculated to be so in its actual structure also. This supports the belief that TRMM/PR is effective to determine a detailed vertical structure of rainfall.

On another date and hour, vertical distributions of radar reflectivity factors respectively obtained by the TRMM/PR in air space just above ground observation points and by the deep mountain radar rain gauge were compared to each other in the same manner as in the previous case.

In the air space just above the respective points, the radar reflectivity factors obtained by the TRMM/PR and the deep mountain radar rain gauge coincided with each other. At the altitude of approximately 4 km, TRMM/PR provided an increased radar reflectivity factor and thereby allowed the bright band characterizing the stratiform rainfall to be accurately observed.

Then, the radar reflectivity factors obtained by the TRMM/PR and the deep mountain radar rain gauge within the entire range of observation are compared to each other for various altitudes. It should be understood that the horizontal resolution of the TRMM/PR is approximately 4 km and the horizontal resolution of the deep mountain radar rain gauge is approximately 1.5 m.

The comparison indicated that, the higher the altitude is, the higher the reliability of the radar reflectivity factors obtained by both the TRMM/PR and the deep mountain radar rain gauge is. This is probably for the reason that the observed radar reflectivity factor is apt to be affected by ground clutter in the mountainous area but free from such effect of ground clutter at an altitude higher than a certain altitude.

En suite, analysis of the vertical structure of rainfall in mountainous area which is difficult for the rainfall radar installed on ground was carried out using TRMM/PR data.

The vertical distribution of rainfall intensity within the range containing two points C and D suggested that there was remarkably intense rainfall of the convective type in the vicinity of lat. 45° N, lat. 136.15° E. This point lies on the southeastern slope of OHDAIGAHARA along which damp air ascends at once from offshore of OWASE City. Such damp air destabilizes the atmospheric conditions and causes typical orographic rainfall. At points C and D, stratiform rainfall having intensity of approximately 10~20 mm/h was observed.

Based on the vertical distribution of rainfall intensity observed at eight points adjacent points C and D, the inventors obtained findings as follow: there is a bright band at the altitude of approximately 4 km; the vertical distribution of rainfall intensity depends on the altitude at all observation points although the rainfall is uneven at an altitude lower than the bright band altitude; and a linear relationship is established between the rainfall intensity and the altitude.

In a similar observation carried out on another date and hour, a linear relationship was established. This was noticeable particularly in the data obtained at an altitude lower than the bright band.

Analysis of the vertical structure of rainfall in the mountainous area was successfully carried out first by using the TRMM/PR data. In the vicinity of OHDAIGAHARA mountaintop, the area to be analyzed, the beam altitude exceeded 3 km even when the minimum beam elevation angle of the rainfall radar on the ground was used and this made it extremely difficult to analyze the rainfall structure in the vicinity of mountain slope.

TRMM/PR is extremely useful for rainfall structure analysis in the area where the observation is restricted by shielding effect of mountainous land with the radar beam altitude inevitably becoming higher as the observation point is spaced farther from the ground radar site.

From the analysis of rainfall vertical structure carried out in the mountainous area using the TRMM/PR data, it was found that the vertical distribution of rainfall depends upon the altitude particularly in the altitude lower than the bright band altitude and a linear relationship is established between the rainfall intensity and the altitude.

Assuming that the rainfall intensity R is represented by the linear function of the altitude H as follows:

$$R(H)=aH+b \quad (1),$$

where constants a, b were identified by regression analysis using the vertical distribution of rainfall intensity observed by the TRMM/PR.

The regression analysis was carried out by two methods. According to one method, the constants are identified using the data of the bright band area. According to another method, the constants are identified using the data obtained at an altitude lower than the bright band altitude.

The rainfall intensity on the ground was estimated using equation (1) having its constants identified by regression analysis and this rainfall intensity was compared to the rainfall intensity obtained by ground observation in order to evaluate the estimation accuracy.

Two examples of the observation will be described. In example 1, the rainfall intensity obtained by ground observation was 22.70 mm/h, the rainfall intensity obtained using the data at the bright band altitude also was 19.02 mm/h and the rainfall intensity obtained using the data at the altitude lower than the bright band altitude was 23.11 mm/h. In example 2, the rainfall intensity obtained by ground observation was 1.03 mm/h, the rainfall intensity obtained using the data at the bright band altitude also was 1.31 mm/h and the rainfall intensity obtained using the data at the altitude lower than the bright band altitude was 1.12 mm/h.

These examples indicated that the linear relationship is established between rainfall intensity and altitude and, as will be apparent from the equation (1), rainfall intensify at each altitude can be represented by the linear function of this altitude.

Such a linear relationship was noticeable particularly in the area lower than the bright band altitude.

The unique arrangement of this invention as has been described above offers effects as follow:

First, a method or system for estimation of rainfall in mountainous area is useful for various purposes such as flood analysis and estimation of water resource reserves because the rainfall intensity R can be estimated as a simple function of the altitude.

Particularly, regression analysis using the data at the altitude lower than the bright band altitude is effective to improve the accuracy of the estimation equation. Furthermore, use of the rainfall radar carried by the TRMM/PR satellite can allow the data collection to be simplified.

The FIGURE is a flowchart showing the basic steps of the present estimation method. The initial verification of the satellite radar using ground radar is shown is step 100. The step of confirming that the data is not affected by ground clutter is shown in step 102. Once this has been determined, step 104 indicates the step observation of the intensity and altitude as determined by satellite radar. Step 106 indicates that a regression analysis is used to determine the values of constants a and b. In step 108 it is indicated that the values determined for a an b are then placed into the equation. This equation can then be used in step 110 to estimate the rain fall at various altitudes.

What is claimed is:

1. A method for estimation of rainfall intensity in mountainous area characterized in that:

rainfall intensity R is estimated as a value equivalent to a linear function of altitude H:

$$R(H)=aH+b$$

where the parameters a and b are identified by regression analysis using vertical distribution of rainfall obtained by satellite radar.

2. The method for estimation of rainfall intensity in mountainous area as defined by claim 1, wherein the regression analysis is carried out using data obtained at the altitude lower than bright band.

3. The method for estimation of rainfall intensity in mountainous area as defined by claim 1, wherein the radar is rainfall radar carried by TRMM/PR satellite.

4. The method for estimation of rainfall intensity in mountainous area as defined by claim 2, wherein the radar is rainfall radar carried by TRMM/PR satellite.

5. A system for estimation of rainfall intensity in mountainous area comprising:

rainfall intensity output means adapted to output rainfall intensity R as a value equivalent to a linear function of altitude H:

$$R(H)=aH+b;$$

and processing means adapted to identify parameters a and b in the above estimate equation by regression analysis using a measurement value obtained by rainfall vertical distribution.

6. The system for estimation of rainfall intensity in mountainous area as defined by claim 5, wherein the regression analysis is carried out using data obtained at the altitude lower than bright band.

7. The system for estimation of rainfall intensity in mountainous area as defined by claim 5, wherein the radar is rainfall radar carried by TRMM/PR satellite.

8. The system for estimation of rainfall intensity in mountainous area as defined by claim 6, wherein the radar is rainfall radar carried by TRMM/PR satellite.

* * * * *